Figure 1:
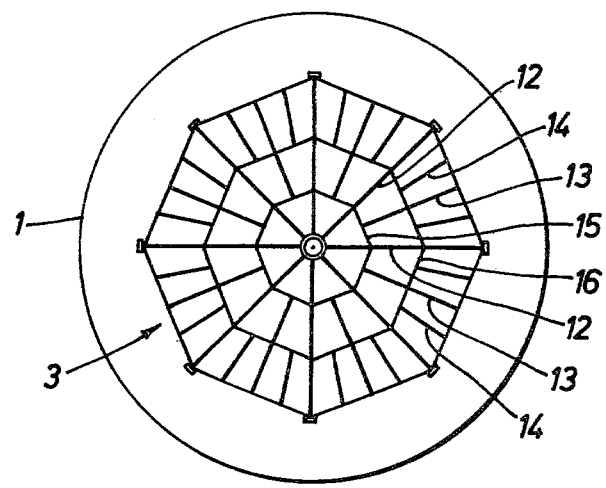

United States Patent [19]

Simpson

[11] 4,274,979

[45] Jun. 23, 1981

[54] MANUFACTURE OF ACTIVATED CARBON

[75] Inventor: Keith Simpson, Llandevaud, Wales

[73] Assignee: Clairaire Limited, Berkshire, England

[21] Appl. No.: 73,227

[22] Filed: Sep. 7, 1979

Related U.S. Application Data

[63] Continuation of Ser. No. 925,925, Jul. 19, 1978, abandoned.

[30] Foreign Application Priority Data

Apr. 21, 1978 [GB] United Kingdom ............... 15940/78

[51] Int. Cl.³ ...................... C01B 31/10; C01B 31/12; B01J 20/20; D01F 9/12
[52] U.S. Cl. .......................................... 252/422; 13/7; 13/22; 252/445; 264/29.2; 423/447.1; 423/447.9
[58] Field of Search ............... 252/421, 422, 445, 447; 423/447.5, 447.7, 447.8, 447.4, 447.1, 447.9; 264/29.2; 13/7, 22

[56] References Cited

U.S. PATENT DOCUMENTS

| 3,847,833 | 11/1974 | Bailey et al. ........................ 252/422 |
| 4,020,273 | 4/1977 | Dix et al. ................................ 13/7 |

FOREIGN PATENT DOCUMENTS 1505095 3/1978 United Kingdom ..................... 252/422

Primary Examiner—P. E. Konopka
Attorney, Agent, or Firm—Kane, Dalsimer, Kane, Sullivan and Kurucz

[57] ABSTRACT

Activated carbon is made by pre-treating a fibrous cellulose material with a Lewis acid comprising one or more selected halides, drying and softening the treated material, suspending the material from a frame in a tensionless manner, heating the suspended material in a furnace to effect carbonization of the cellulosic material in an environment which is substantially non-reactive towards that material, activating the suspended carbonized material at an elevated temperature in an atmosphere comprising an activating gas until the desired degree of activation has been produced, and thereafter cooling the furnace, the furnace having at least one heating element at its base and at least one heating element arranged on or in a side wall, each heating element being spaced apart from the suspended material.

34 Claims, 6 Drawing Figures

MANUFACTURE OF ACTIVATED CARBON

This is a continuation of application Ser. No. 925,925, filed July 19, 1978 now abondoned.

This invention relates to the manufacture of activated carbon from a fibrous cellulosic material, more especially to the manufacture of such carbon in the form of cloth.

According to one previous proposal, activated carbon in cloth form is produced in a continuous manner by pulling a fibrous organic cloth, for example, a cellulosic cloth, upwardly between and spaced from a pair of longitudinally extending heating elements arranged to raise the temperature of the moving cloth to effect carbonisation of the cloth in an inert atmosphere followed by activation of the carbonised cloth. The same previous proposal also comprises treatment of the cloth with certain Lewis acids before carbonisation.

British Patent Specification No. 1,505,095 relates to a batch process in which a length of cellulosic cloth is first treated with one or more Lewis acids, the treated cloth is dried and then softened by means of a breaking machine, and the softened cloth is suspended from a frame in a tensionless manner (that is to say, under no tension except that arising from its own weight) and heated in a furnace in a suitable atmosphere to effect carbonisation followed by activation of the cloth. As described in Specification No. 1,505,095, the heating elements in the furnace are arranged across its base.

The present invention provides a process for the manufacture of activated carbon, which comprises treating a fibrous cellulosic material, preferably a cellulosic cloth, by contacting it with one or more Lewis acids selected from halides of zinc, aluminium, calcium, magnesium, iron, barium, ammonium and chromium, drying the treated material, subjecting the material to a mechanical softening treatment, suspending the material from a frame in a tensionless manner, heating the suspended material in a furnace to effect carbonisation of the cellulosic material in an environment which is substantially non-reactive towards that material, activating the suspended carbonised material at an elevated temperature in an atmosphere comprising an activating gas until the desired degree of activation has been produced, and thereafter cooling the furnace, the furnace having at least one heating element at its base and at least one heating element arranged on or in a side wall, each heating element being spaced apart from the suspended material.

The process of the invention is capable of producing activated carbon of surprisingly good quality and in good yield. It is especially surprising that the variation in product quality over the length of the material is acceptably small, whereas it might have been expected that the outer portions of the material suspended in the furnace would be affected by the carbonisation and activation operations to a substantially greater extent than those portions of the fibrous material that are situated towards the interior of the configuration, owing to the relatively close proximity of the lateral heating elements to those outer portions and to the fact that the inner portions would seem to be shielded from those heating elements by the intervening fibrous material, especially in the case of cloth material.

Also, as compared with the previously proposed continuous process, the process of the invention offers various advantages. Firstly, it is capable of producing activated carbon cloth of similar quality with higher throughput at substantially lower capital cost.

Secondly, in the process of the invention, the residual acid content of the activated carbon product (for example, hydrochloric acid derived from the use of a chloride as Lewis acid) can be made relatively small. Thus, in the continuous process, re-absorption of, for example, hydrochloric acid in the upper part of the furnace (especially in the region near the outlet where the temperature of the cloth may have fallen to 30° C. or so), may result in a residual acid content of from 2 to 5%, which in turn necessitates a special washing treatment of the product with water before use. By contrast, in the process of the present invention, the activated carbon product can be made practically free from acid contamination, that is to say, with a residual acid content of only 0.1 to 0.5%, and even less in some cases. Those beneficial results are obtainable by a combination of temperature control and gas purge, arranged to ensure that most of any acid vapour is expelled before cooling the activated carbon product.

Thirdly, "topping-up" the activity of the product, by prolonging the activation stage after testing a sample of the product, is a simple operation in the process of the invention, but impossible in the continuous process.

The fibrous cellulosic material may be in the form of a single filament or as staple fibre, but is preferably a cellulosic cloth.

The preliminary treatment of the cellulosic material with one or more Lewis acids provides various beneficial effects depending primarily on the particular acid or acids used, but also on the treatment time and on the processing and drying temperatures employed. The advantages obtainable by the Lewis acid treatment include increased carbonisation yield, and increased product strength.

Advantageously, the or each Lewis acid is a bromide or a chloride, and is preferably a chloride. A preferred treating agent comprises a mixture of zinc chloride, aluminium chloride and ammonium chloride, the preferred concentration of each chloride in aqueous solution being approximately 3% by weight.

In general, the fibrous cellulosic material is contacted (for example, by immersion or spraying) with a solution or dispersion, more especially aqueous, of the selected Lewis acid or acids. The concentration of Lewis acid in the solution or dispersion may be in the range of from 1 to 30% by weight, preferably from 2 to 10% by weight.

In the process of the invention, the fibrous cellulosic material is contacted with one or more Lewis acids before any carbonisation is effected. It is possible, however, to incorporate a further quantity of a Lewis acid with the cellulosic material during carbonisation.

Further details regarding the effect of various Lewis acid treatments on carbonisation may be found, for example, in British Patent Specification No. 1 301 101.

The treated cellulosic material may be dried at a temperature in the range of from room temperature to 140° C. or more, a drying temperature towards the upper or lower end of that range being preferred.

Softening of the cellulosic material is remove or reduce the stiffness resulting from the Lewis acid treatment may be effected in a variety of ways, for example, by manual working or by drawing the material over a smooth edge. Preferably, however, to produce an activated carbon of high breaking strength, the softening is effected using a breaking machine, which may be a pin-stenter or, more especially, the type of machine known in the textile industry as a spiral-roller breaker.

The fibrous cellulosic material is suspended from a frame in a tensionless manner, that is to say, under no tension except that arising from the weight of the material. As a result, substantially full shrinkage of the material takes place during the carbonisation and activation operations. Because the material is suspended so as to be able to shrink freely in all directions, no tension is caused by the shrinkage. By contrast, in the previously proposed continuous process referred to hereinbefore, tension is generated in the warp as the cloth shrinks, resulting in weakening of the cloth product.

It is important, however, to avoid undue tension arising from the weight of the fibrous material, especially in the case of cloth. In general, the height of a cloth configuration suspended from the frame should not exceed 5 meters, and is advantageously not more than 2 meters. A preferred height is 1 meter±10%.

Naturally, the tension produced in suspended cloth by its own weight depends in part on the weight per unit area of the cloth and, advantageously, the maximum tension in suspended cloth (in a vertical direction and excluding regions in the immediate vicinity of points at which the cloth is suspended), is 5 gm per cm length across the top of the suspended configuration, and the maximum tension preferably does not exceed 4 gm per cm length.

Advantageously, the weight of a cellulosic cloth before the Lewis acid treatment is in the range of from 20 to 30 $mg/cm^2$. Typically, the diameter of the fibres in the cloth will be in the range of from 5 to $20\mu$.

Advantageously, the suspension frame is attached to the underside of a removable lid of the furnace, and is preferably pivotally mounted under the lid to facilitate hanging of the fibrous cellulosic material.

Preferably, a cellulosic cloth is suspended in a spiral configuration, but other configurations may be adopted, for example, a serpentine or star-spahed configuration. It will be appreciated that, in terms of process throughput, it is desirable to suspend the cloth in a configuration which allows the maximum length of cloth to be contained within a given volume. That consideration is subject, however, to the turns or folds of cloth being suspended sufficiently far apart to permit adequate heat transfer to the whole length of cloth, and adequate access of gas, especially during activation.

Advantageously, the length of a cellulosic cloth that is suspended from the frame is in the range of 50 to 150 meters, preferably at least 80 meters, and more especially from 90 to 110 meters.

A cellulosic cloth material may be suspended by means of hooks secured to the frame and passing through an upper edge portion of the cloth. Instead, cloth may be suspended by means of clips which engage the upper edge portion, or may be folded longitudinally over a series of transverse supporting rails.

In the case where cloth is suspended from hooks or other suspension means acting on an upper edge portion, there will initially be excess cloth hung between adjacent suspension positions to allow for shrinkage during the carbonisation and activation operations. As a result, the cloth will hang initially in a wave-like form, and adjacent turns or folds may touch in places.

Advantageously, the distance between adjacent suspension positions along the same fold or turn of a suspended cloth configuration does not exceed 15 cm. The minimum distance between the suspension positions of adjacent turns or folds of the suspended cloth may be in the range of from 1 to 5 cm., advantageously from 1 to 3 cm., and preferably from 1.5 to 2.5 cm. The minimum preferred spacing of the suspension positions of adjacent turns or folds depends on the height of the suspended configuration (which corresponds to the width of a cloth strip to be processed), and may vary, for example, from 1 cm. in the case of a ½ m. width to 2 cm. for a meter width. The preferred spacings can be exceeded, but there will in general be little or no advantage in so doing to compensate for the resulting reduced area of cloth that could then be accommodated at any one time in a furnace of given volume, and for the resulting reduced throughput.

The frame and associated suspension means will be arranged to enable the fibrous cellulosic material to be suspended in the desired configuration. A preferred form of frame, for suspending cloth in a spiral, comprises a plurality of radial arms (each, say, 0.5 to 1.0 . in length) each providing a series of discrete suspension positions, some of the arms extending outwardly from cross-pieces arranged between adjacent radial arms. Advantageous, the number and arrangement of radial arms and of the suspension means thereon is such that the maximum spacing between adjacent suspension positions along the same turn of the cloth is 15 cm., and the spacing between adjacent suspension positions along the same radial arm is advantageously in the range of from 1 to 5 cm., preferably from 1 to 3 cm., more especially from 1.5 to 2.5 cm.

The spacing between the top and bottom of the suspended configuration and the top and bottom, respectively, of the furnace may be in the range of from 10 to 20 cm. (measured prior to shrinkage), more especially about 15 cm. Similarly, the spacing between the lateral heating element(s) and the outside of the suspended configuration may be from 10 to 20 cm., more especially 15 cm.

The shape and dimensions of the interior of the furnace will correspond generally to the size and shape of the suspended configuration. For example, for cloth suspended in the form of a spiral, the interior of the furnace will preferably be right-circular cylindrical. Advantageously, the spacing between the suspended configuration and the side wall of the furnace is substantially constant over the whole periphery of the configuration.

By way of example, the interior dimensions of a cylindrical furnace may be within the following ranges: internal diameter 1.5 to 2.0 m., more especially about 1.8 m., in internal height from the furnace base to the underside of the frame, 1.0 to 1.5 m., more especially about 1.2 m. The diameter of a spiral cloth configuration suspended in such a furnace may, for example, be in the range of from 1.1 to 1.7 m., more especially about 1.3 m.

It will be appreciated that the maximum internal dimensions of the furnace are governed by the requirement that there should be adequate heat transfer to the whole suspended configuration.

The or each heating element in or on the side wall of the furnace may comprise a circumferentially extending element, and there is preferably a plurality of such elements, say, from 6 to 12, more especially 9 arranged at spaced intervals up the side wall of the furnace. Instead, there may be a plurality of upwardly extending heating elements, arranged in a circumferentially extending array in or on the side wall, each preferably extending substantially vertically. Depending on the effective area of such upwardly extending elements and on the furnace dimensions, a minimum of four elements, equally spaced around the furnace circumference, may be sufficient in the case of a cylindrical furnace, although preferably the number of elements is greater.

Advantageously, the heating element(s) are arranged in or on the side wall of the furnace to maintain a uniform temperature up that wall in the region occupied by the suspended fibrous material.

The base of the furnace may be provided with heating elements arranged in the form of a cross (as seen in plan view), or there may be provided a plurality of elements arranged in the form of concentric rings, prefeably circular.

The or each heating element may be a gas- or oil-fired burner, or a microwave device, but is preferably an electrical resistance heater. A resistance heater at the side of the furnace may comprise a coiled resistance element, which may be in the form of an open coil or may be wound on a ceramic core, and may be housed in a suitable sheath of, for example, silica. An electrical resistance heater at the base of the furnace is preferably a spiral-wound resistance element with a ceramic core.

The production of activated carbon with small variation in quality over the length of the material is unexpectedly dependent on the provision of heating elements at the base and at the side of the furnace. Much larger variations in product quality would be obtained in a furnace having heating means only in a side wall, or in a furnace having heating means only at the base.

Advantageously, the heating elements used in the process of the invention are arranged to transfer heat to the suspended material by direct radiation and convection, with no intervening gas distributor means. In particular, the use of a perforated gas distributor plate between the suspended material and a radiant heat source tends to reduce the uniformity of the product.

The furnace may be provided with cooling means, for example, conduits for conducting coolant fluid across the base of the furnace and/or conduits or a cooling jacket arranged up the side wall of the furnace, to facilitate rapid cooling of the activated carbon product and thus increasing throughput.

The properties of the activated carbon product are dependent on the rate at which the temperature of the furnace is increased in the carbonisation and activation operations. In general, rapid temperature increase has deleterious effects. Advantageously, the rate at which the temperature of the furnace is increased does not exceed 6° C. per minute in either operation, and preferably does not exceed 4° C. per minute.

It is especially important that the rate of temperature increase during carbonisation (especially up to temperatures in the region of 300° C. to 350° C.) should be kept relatively low, (otherwise the product tends to be brittle) and preferably it does not exceed 3° C. per minute. The rate of temperature increase during activation may be the same as, or even less than, that during carbonisation, but is preferably greater.

Advatageously, except during the temperature-holding periods discussed below, the rate of increase of temperature is at least 1.5° C. per minute, to enable the temperature programme to be completed in an economically practicable period.

In some cases, the quality of the activated carbon product can be improved by holding the temperature in the furnace within one or more narrow temperature bands for periods that will generally be in the range of from 15 to 60 minutes, preferably from 25 to 35 minutes.

The or each narrow temperature band may comprise a range not exceeding 10° C., advantageously not exceeding 5° C. Preferably, the temperature is maintained substantially constant in the or each holding period, but in practice it will be difficult to avoid local temperature variations of up to 5° C. or so.

Advantageously, the temperature of the furnace is held during carbonisation for a period of at least 15 minutes within a 10° C. band in the range of from 315° C. to 350° C., the band preferably extending from 315° C. to 325° C. In addition to or instead of a temperature-holding period in the range of from 315° C. to 350° C., it may be advantageous in some cases to hold the temperature during carbonisation of a period of at least 15 minutes within a 10° C. band in the range of from 130° C. to 315° C. Such temperature-holding periods assist in ensuring that carbonisation is substantially complete, and can also increase the breaking strength of the product, in some instances by as much as 50%.

The rate and uniformity of activation depends on the temperature of the furnace and on the concentration of the activating gas. In general, it will be necessary to attain a temperature of at least 820° C. to effect activation at an acceptable rate, and the temperature is preferably raised to at least 870° C., more especially at least 900° C., to ensure uniformity of activation.

The desired degree of activity will depend on the intended use of the activated carbon product. For example, an activated carbon for use in a respirator will normally need to be more active than a product for use in an air-conditioning system.

It will be appreciated that the higher the activity of the product (that is to say, the longer the activation time and/or the higher the temperature reached during the activation) the lower will be the product yield and product strength.

In general, the temperature of the furnace during activation should not exceed 1000° C., advantageously does not exceed 950° C. and, more especially, does not exceed 920°±10° C.

In general, the furnace is maintained during activation at a temperature within the range of from 870° to 1000° C. for a period of at least 30 minutes before cooling is commenced. Preferably, the said period does not exceed 45 minutes.

In determining the length of the activating period before cooling is commenced, it should be noted that activation will continue to a small extent at the beginning of the cooling operation. Normally, however, this effect will be of only minor significance.

In the cooling operation, it is desirable in principle to open the furnace at the highest temperature practicable, because the total time required for cooling is thereby minimised. It will normally be possible to open the furnace to atmosphere when the temperature has fallen to 100° C., but it may in some cases be possible to open the furnace at a significantly higher temperature, say 300° C. or even higher.

The maximum temperature at which the furnace can be opened is determined primarily by the need to avoid excessive adsorption of the ambient atmosphere, especially ambient air, (which is an exothermic reaction) and the consequent risk of self-ignition. If the furnace is flushed with nitrogen or another inert gas during or before cooling, the risk of excessive adsorption of ambient air on opening the furnace is reduced, which in turn enables the furnace to be opened at correspondingly higher temperatures.

The following is an example of a preferred temperature programme in the case of a cellulosic cloth carbonised and activated in an atmosphere of carbon dioxide:

(a) 20° C. to 130° C. at 100° C. per hour;
(b) 130° C. to 320° C. at 150° C. per hour;
(c) maintain at 320° C. for 30 minutes;
(d) 320° C. to 920° C. at 200° C. per hour;
(e) Maintain at 920° C. for 30 minutes; and
(f) cool as quickly as possible to 100' C. and then open the furnace.

The above programme may be varied in accordance with the general directions given hereinbefore. In particular, there may be an additional temperature-holding period of 30 minutes between 130° C. and 320° C.

The atmosphere in the furnace during carbonisation advantageously comprises one or more of nitrogen, carbon dioxide, helium, argon or steam. The carbonisation atmosphere is substantially non-reactive towards the cloth but may, as in the case of carbon dioxide and steam, effect some oxidation of decomposition products. Preferably, a current of gas is passed through the furnace to remove volatile decomposition products formed during carbonisation. Instead, however, the carbonisation can be conducted in a normally sealed vessel, the volatiles being flushed out at intervals or when carbonisation is substantially complete. Activation may also be conducted under sealed conditions, but it is advantageous to allow at least a proportion of any gas generated by the activation to pass out of the furnace through suitable outlet means, and there may advantageously be gas flow into and through the furnace during activation.

The activating gas advantageously comprises carbon dioxide and/or steam, although water gas, producer gas, and other coke-oven by-products may be used to bring about the necessary controlled oxidation.

Advantageously, the carbonisation and activation operations are conducted under a small positive pressure in relation to atmosphere (say, from 5 to 25 cm. of water) to assist in preventing leakage of air into the furnace, but higher pressures are in general disadvantageous to the carbonisation and activation reactions.

Activated carbon produced according to the invention may be used, for example, in respirators, air-conditioning systems, and for industrial filtration and de-colourisation purposes. The activated carbon of the invention also has various medical applications, for example, in bandages and for de-odorising purposes. Further, the carbon product can be used in cigarettes for filtration purposes.

Figure 2:
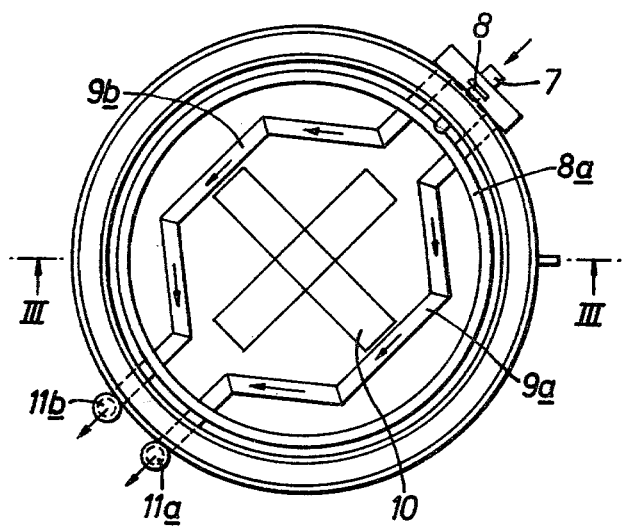
Figure 3:
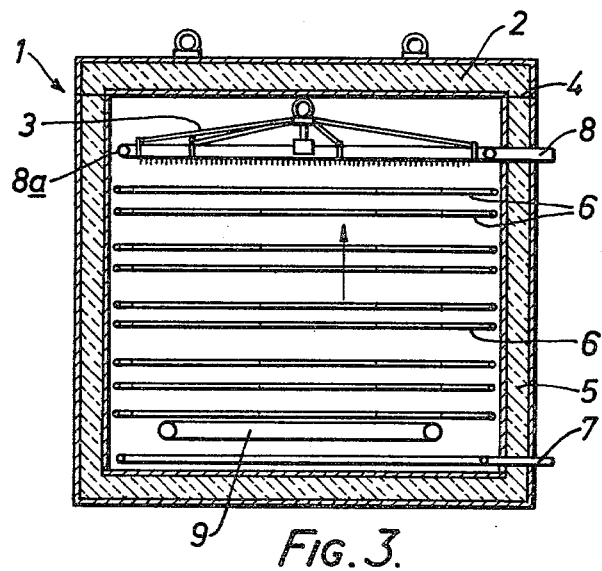
Figure 4:
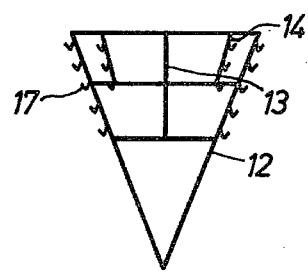
Figure 5:
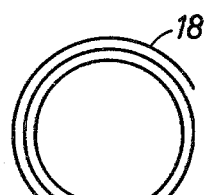
Figure 6:
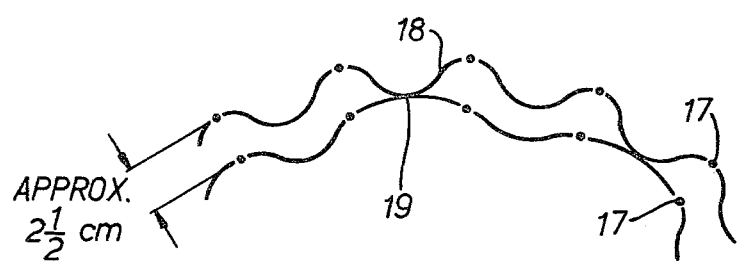

One form of furnace and suspension frame for use in the process of the invention will now be described, by way of example, with reference to the accompanying drawings, in which:

FIG. 1 is a plan view of the frame as seen from below;
FIG. 2 is a plan view of the base of the furnace;
FIG. 3 is a vertical section through the furnace along the line III—III in FIG. 2;
FIG. 4 shows, in diagrammatic form, part of the frame showing the arrangement of suspension hooks;
FIG. 5 is a plan view of a length of cloth suspended from the frame in a spiral configuration; and
FIG. 6 shows part of the plan view of FIG. 5 in more detail, including the position of the suspension hooks.

Referring firstly to FIG. 3, a generally cylindrical furnace 1 has a removable lid 2 having a cloth suspension frame 3 pivotally mounted on its underside. A seal 4 (for example, a liquid seal) is provided between the furnace and the lid. The base, walls and lid of the furnace are provided with insulation 5.

A plurality of circumferentially extending electrical heating elements 6 is arranged on the side wall of the furnace. Each element 6 comprises a coiled, core-less resistance element.

The furnace has a gas inlet 7 and an exhaust outlet 8 (which includes a non-return valve), to enable the gaseous atmosphere and flow rate inside the furnace to be controlled. Inside the furnace, the exhaust gas conduit comprises a circumferentially extending pipe 8a having apertures at regular intervals to avoid flow variations.

A conduit 9 for cooling fluid is provided across the base of the furnace.

By way of example, the internal diameter of the furnace may be 72 inches (1.83 m.) and the furnace height measured from the base to the underside of the frame 3 may be 48 inches (1.22 m.).

Referring to FIG. 2, the base of the furnace is provided with heating elements 10 arranged in the form of a cross, the heaters 10 being spiral-wound electrical resistance elements with a ceramic support. The cooling conduit 9 has two branches 9a and 9b, having outlets 11a and 11b, respectively.

Referring now to FIG. 1, the suspension frame comprises a plurality of radial arms some of which (12) extend from the centre of the frame and others (13 and 14) extend outwardly from cross-pieces (15 and 16) arranged between adjacent radial arms. Each radial arm is provided with a series of hooks 17 (as shown in FIG. 4), or other suspension means providing a plurality of discrete suspension positions.

As shown in FIG. 5, the length of cloth 18 is suspended from the hooks (or other suspension means) in the form of a spiral. The number and arrangement of the hooks 17 is such that the distance between adjacent suspension positions along the same turn of the spiral does not exceed 15 cm. The length of cloth in the spiral is, for example, 100 meters and its width (which corresponds to the height of the suspended configuration) is, for example, 1 meter.

Initially, to allow for shrinkage during the carbonisation and activation operations, excess cloth in hung between adjacent suspension positions. As a result, at least the upper edge of the cloth will hang initially in a wave-like form, and adjacent turns may touch in some places (as can be seen, for example, at 19 in FIG. 6).

As also shown in FIG. 6, the spacing between adjacent hooks 17 on the same radial arm is approximately 2.5 cm., that then being the distance between adjacent turns.

In operation, a cellulosic cloth is contacted with one or more Lewis acids as hereinbefore specified, dried, softened mechanically, and suspended from hooks 17 on the frame 3 in the form of a spiral (FIG. 5), utilising the pivotal movement of the frame on the furnace lid 2 to facilitate loading.

The lid and frame are then placed in position in the furnace (FIG. 3). Carbon dioxide is introduced through the inlet 7 to establish, in the steady state, a flow rate of 30 liters per minute through the furnace. Exhaust gas (carrying volatile decomposition products during carbonisation) leaves the furnace via the circumferentially extending pipe 8a and outlet 8.

Once the air originally in the furnace has been flushed out by the carbon dioxide, the temperature of the furnace is raised, for example, through the following programme:
(a) 20° C. to 130° C. at 100° C. per hour;
(b) 130° C. to 320° C. at 150° C. per hour;
(c) maintain at 320° C. for 30 minutes;
(d) 320° C. to 920° C. at 200° C. per hour;
(e) maintain at 920° C. for 30 minutes; and
(f) cool as quickly as possible to 100° C. and then open the furnace.

The above programme may be varied in accordance with the general directions given hereinbefore. In particular there may be an additional temperature-holding period of 30 minutes between 130° C. and 320° C.

The following Example illustrates the invention:

EXAMPLE

A length of woven viscose rayon, measuring 50 m. × 100 cm., weighing 24 mg/cm$^2$ and having a square-form linen weave, was immersed for 2 minutes in a bath containing a solution of 3% by weight each of zinc chloride, ammonium chloride and aluminium chloride in water.

The treated cloth was dried on a heated air bed under minimum tension and the dried cloth was fed through a spiral-roller breaker having seven pairs of rollers.

The cloth was then suspended in a spiral configuration in a furnace as described with reference to the accompanying drawings, the total electrical power consumption of the wall heaters being the same as that of the base heaters.

After purging for one hour with carbon dioxide, the furnace was taken through the following temperature programme:
(a) 20° C. to 130° C. at 100° C. per hour;
(b) 130° C. to 320° C. at 150° C. per hour;
(c) maintain at 320° C. for 30 minutes;
(d) 320° C. to 920° C. at 200° C. per hour;
(e) maintain at 920° C. for 30 minutes; and
(f) cool to 100° C. over 4 hours and then open the furnace.

The resulting activated carbon cloth had shrunk to dimensions of 30 m. × 66 cm.

To test the adsorption properties of the product, the silicone oil heat of wetting was measured for samples taken at various points along the spiral, and the results were as follows, the samples being from the centre of the strip which in each case:

| Sample | Heat of wetting (calc./g.) |
|---|---|
| Interior of spiral | 14.5 |
| 24 m. in | 14.1 |
| 12 m. in | 12.1 |
| Exterior of spiral | 12.8 |

In addition, tests on samples taken at each edge of the strip showed only ±5% variation across the strip at each of the measuring positions indicated above.

It will be appreciated that the results show only small variation in product activity along the length of the suspended spiral.

What I claim is:
1. A batch process for the manufacture of activated carbon, which comprises;
   (a) treating a fibrous cellulosic material by contacting it with at least one Lewis acid selected from the group consisting of halides of zinc, aluminum, calcium, magnesium, iron, barium, ammonium and chromium;
   (b) drying the treated material;
   (c) subjecting the dried material to a mechanical softening treatment;
   (d) suspending the softened material from a frame in a tensionless manner, said frame being positioned within a furnace adapted to effect carbonisation of the cellulosic material, the furnace having at least one heating element at its base and at least one heating element arranged on a side wall, each heating element being spaced apart from the suspended material, whereby said suspending places a plurality of the fibers in the fibrous cellulosic material transverse across the furnace;
   (e) heating the suspended material in said furnace to effect carbonisation of the cellulosic material; in an environment which is substantially non-reactive towards the material, said heat being directed into the suspended material from a first direction on the side of the suspended material and from a second direction beneath the suspended material;
   (f) activating the suspended carbonised material in an activating gas until the desired degree of activation has been produced; and
   (g) thereafter cooling the activated material.
2. A process as claimed in claim 1, wherein the fibrous cellulosic material comprises a cellulosic fabric.
3. A process as claimed in claim 2, wherein the height of the fabric configuration suspended from the frame does not exceed 5 meters.
4. A process as claimed in claim 3, wherein the said height does not exceed 2 meters.
5. A process as claimed in claim 2, wherein the fabric is suspended in the form of a spiral.
6. A process as claimed in claim 2, wherein the distance between suspension points of adjacent turns or folds of the suspended fabric is in the range of from 1 to 5 cm.
7. A process as claimed in claim 2, wherein the distance between suspension points along each individual turn or fold of the suspended fabric does not exceed 15 cm.
8. A process as claimed in claim 1, wherein the distance between the suspended configuration and the inside of the furnace, measured before any shrinkage of the material has occurred, is in the range of from 10 to 20 cm.
9. A process as claimed in claim 1, wherein there is a plurality of circumferentially extending heating elements arranged at spaced intervals up the side wall of the furnace.
10. A process as claimed in claim 1, wherein there is a plurality of upwardly extending heating elements arranged in a circumferentially extending array in or on the side wall of the furnace.
11. A process as claimed in claim 1, wherein the heating elements are arranged to maintain a uniform temperature up the side wall of the furnace in the region occupied by the suspended fibrous material.
12. A process as claimed in claim 1, wherein the base of the furnace is provided with heating elements arranged in the form of a cross.
13. A process as claimed in claim 1, wherein the heating elements are arranged to transfer heat to the suspended material by direct radiation and convection.

14. A process as claimed in claim 1, wherein the rate at which the heating of the furnace is increased does not exceed 6° C. per minute.

15. A process as claimed in claim 14, wherein the said rate does not exceed 4° C. per minute.

16. A process as claimed in claim 1, wherein the rate at which the heating of the furnace is increased is at least 1.5° C. per minute.

17. A process as claimed in claim 1, wherein the rate at which the heating of the furnace is increased during carbonisation of the fibrous cellulosic material does not exceed 3° C. per minute.

18. A process as claimed in claim 1, wherein the rate at which the heating of the furnace is increased during activation of the fibrous material is greater than the rate of increase during carbonisation of the material.

19. A process as claimed in claim 1, wherein a temperature of at least 870° C. is established during activation.

20. A process as claimed in claim 19, wherein a temperature of at least 900° C. is established during activation.

21. A process as claimed in claim 1, wherein the temperature established during activation does not exceed 1000° C.

22. A process as claimed in claim 21, wherein the temperature established during activation does not exceed 950° C.

23. A process as claimed in claim 1, wherein the maximum temperature established during activation is in the range of from 910° C. to 930° C.

24. A process as claimed in claim 1, wherein the temperature of the furnace is held during carbonisation for a period of from 15 to 60 minutes within a 10° C. band in the range of form 315° C. to 350° C.

25. A process as claimed in claim 24, wherein the said band extends from 315° C. to 325° C.

26. A process as claimed in claim 1, wherein the temperature of the furnace is held during carbonisation for a period of from 15 to 60 minutes within a 10° C. band in the range of from 130° C. to 315° C.

27. A process as claimed in claim 1, wherein during activation the furnace is maintained at a temperature within the range of from 870° to 1000° C. for a period of at least 30 minutes before cooling is commenced.

28. A process as claimed in claim 1, wherein during activation the furnace is maintained at a temperature in the range of from 870° to 1000° C. for a period not exceeding 45 minutes before cooling is commenced.

29. A process as claimed in claim 1, wherein the carbonisation is conducted in an atmosphere comprising at least one inert gas selected from the group consisting of nitrogen, carbon dioxide, helium, argon and steam.

30. A process as claimed in claim 1, wherein the atmosphere in the furnace during activation comprises at least one of carbon dioxide and steam.

31. A process as claimed in claim 1, wherein the carbonisation and activation of the material is conducted under a pressure not exceeding 25 cm. of water.

32. A process as claimed in claim 1, wherein a current of gas is passed through the furnace during carbonisation to remove volatile decomposition products formed during carbonisation of the material.

33. A process as claimed in claim 1, wherein said group of Lewis acids consists of chlorides.

34. A process as claimed in claim 1, wherein the mechanical softening treatment is effected with a textile breaking machine.

* * * * *

UNITED STATES PATENT AND TRADEMARK OFFICE
CERTIFICATE OF CORRECTION

PATENT NO. : 4,274,979
DATED : June 23, 1981
INVENTOR(S) : Keith Simpson

It is certified that error appears in the above—identified patent and that said Letters Patent is hereby corrected as shown below:

Col. 2, line 62; - "is" should read -- to --

Col. 3, line 39; - "spahed" should read -- shaped --

Col. 9, line 48; - "which" should read -- width --

Col. 9, line 51; - "calc." should read -- cals. --

Signed and Sealed this

Twenty-seventh Day of October 1981

[SEAL]

Attest:

Attesting Officer

GERALD J. MOSSINGHOFF

Commissioner of Patents and Trademarks